United States Patent
Hughes, II

(10) Patent No.: US 6,299,126 B1
(45) Date of Patent: Oct. 9, 2001

(54) APPARATUS FOR CHANGEABLY FORMING INFORMATION ON DIE CAST OR MOLDED MEMBERS

(76) Inventor: Robert H. Hughes, II, 3189 Winslow Way, Arnold, MO (US) 63010

( * ) Notice: Subject to any disclaimer, the term of this patent is extended or adjusted under 35 U.S.C. 154(b) by 0 days.

(21) Appl. No.: 09/280,465

(22) Filed: Mar. 30, 1999

(51) Int. Cl.$^7$ .................................................. B29C 33/00
(52) U.S. Cl. ......................... 249/103; 249/140; 425/195
(58) Field of Search ................... 249/103, 104, 249/140, 155; 164/229; 425/192 R, 195

(56) References Cited

U.S. PATENT DOCUMENTS

| | | | |
|---|---|---|---|
| 4,708,314 | * 11/1987 | Kuhling | 249/103 |
| 5,038,504 | * 8/1991 | Modigh | 40/327 |
| 5,152,216 | 10/1992 | Bourgeois | 101/35 |
| 5,620,716 | * 4/1997 | Opitz | 249/169 |
| 5,736,168 | * 4/1998 | Goyal et al. | 425/183 |
| 5,762,982 | * 6/1998 | Knepper et al. | 425/526 |
| 5,902,512 | * 5/1999 | Streit | 249/103 |

FOREIGN PATENT DOCUMENTS

89 / 02831 * 10/1988 (WO) .

OTHER PUBLICATIONS

Pages of Catalog entitled D–M–E Standard Multi–Data Mold Dating Inserts for Plastics Molds, dated Sep. 1998.

* cited by examiner

*Primary Examiner*—Nam Nguyen
*Assistant Examiner*—Donald Heckenberg
(74) *Attorney, Agent, or Firm*—Haverstock, Garrett & Roberts LLP

(57) ABSTRACT

Apparatus for changeable forming information, such as date, time, shift, and/or lot of manufacturer information, on members being die cast or molded. The present apparatus includes at least one information forming element adapted to be mounted in communication with the interior cavity of the die or mold and having a face positioned for forming information on the member. The face is adjustably movable relative to a reference element by an adjusting element located externally to the die or mold. According to a preferred aspect of the invention, the apparatus includes at least one additional information forming element, the additional element being concentric with the first named information forming element and being independently rotatable to allow quickly and easily changing the information to be formed on the member.

19 Claims, 3 Drawing Sheets

APPARATUS FOR CHANGEABLY FORMING INFORMATION ON DIE CAST OR MOLDED MEMBERS

TECHNICAL FIELD

This invention relates generally to apparatus for die casting and molding, and more particularly, to apparatus for forming information such as, but not limited to, date, time, shift and/or lot information, on members or parts as they are die cast or molded, the apparatus allowing quickly and easily changing the information from outside of the die or mold.

BACKGROUND ART

Die cast parts and members of aluminum, magnesium and other metallic materials are used extensively in the automotive field and many other applications. Die casting is a process of injecting molten metal into a die casting die. The primary components of a die casting die include cavity blocks that are precisely dimensioned pieces of very hard steel, such as H-13 tool steel or the like. The cavity blocks include interior surfaces machined to the actual shape of the surfaces of the part to be die cast and define an interior cavity representative of the part. One cavity block is generally called the ejector cavity block. Another is called the cover cavity block. The ejector cavity block usually stands "proud", that is, it extends above the parting line surface located between the ejector cavity block and the cover cavity block when "closed" together. The cover cavity block usually includes a depression machined in the steel. When the two cavity blocks are closed together, the molten metal can be injected into the interior of the cavity, to form the die cast part.

The cavity blocks are typically installed in a mold base. A mold base consists of two blocks of steel, usually made from 4140 steel or the like. Each block has a precision pocket machined into it having a size to allow a cavity block to fit therein. The cavity blocks are bolted into each respective "half" of the mold base. The mold base halves have precision holes for receiving precision alignment pins and bushings. After the pins are installed into one half and bushings in the other half, these two pieces can "close" together, aligning the cover cavity block over the ejector cavity block very precisely.

The cover half of the mold base has a large hole through it. This hole is referred to as a "shot" hole. The molten metal is injected through the shot hole. The ejector cavity block has a passage machined in it, called a runner. The runner extends from the cover half shot hole to the interior cavity area, allowing the molten metal to "feed" from the hole to the cavity. After solidification of the metal occurs, the two "halves" are separated or "opened up", exposing the finished die cast part or member. Holes extend through the ejector cavity block to the interior cavity area and pins are operable in the holes to release the cast part or member from the mold. These pins are called ejector pins.

Molded plastics parts and members are also used extensively in the automotive field, and in many other applications. Injection molding is a process of injecting molten plastics material into a mold constructed similarly to a die casting die, as explained above, including mold halves having interior surfaces which define the part surfaces and enclose an interior cavity representative of the part to be molded. When the mold halves are "closed" the molten plastics material is injected through holes into the interior cavity under high pressure and temperature to form the part. After solidification of the plastics material, the mold halves are separated to allow removal of the finished molded part.

In many applications it is highly desirable that the die cast or molded part or member be identifiable as to the time and date it was produced, to give the part or member traceability. Knowing the date of manufacture provides a means to identify a group of parts that may be defective. For instance, they may be the wrong alloy, dimensionally wrong, or produced under improper conditions or the settings required for that particular part. Knowing the date of manufacture also enables identifying what level of revision the part is. Defective designs and dimensionally incorrect parts can fail. Knowing the date or lot of manufacture allows users to identify what parts are defective.

Various devices are known for forming date codes and other traceable information on die cast and molded parts. In the most common devices, limited information is formed on a part. Generally, this information includes only the year and month of manufacture. An example of a common date code device is a cylindrical pin having an end face including a star shape wheel with twelve graduations evenly spaced at 30° apart. One graduation will be distinguished from the other eleven, by being longer to serve as a base line. Generally, this longer graduation represents the month of January. In order to indicate a month, a prick punch is used to produce a small dent or impression in the pin face surface between the graduations, progressing clockwise from the base line indicating the next month, February, then March and so on.

A limitation of this date code device is that someone has to get between the die or mold halves and punch a dent in the next month's space or a monthly basis. This is a problem because the die faces are generally not spaced far apart; they can be as hot as 400° F.; and lighting is almost always very poor. There is also the possibility that the operating mechanism has not been properly locked out on the die casting or molding machine. If the die casting or molding machine is not locked out properly, the machine could close the die or mold halves, crushing the person between them.

There are also other known types of date codes, including pointers or other elements that are manually indexable or rotatable using a screw driver or other tool to indicate a given month. However, these known devices still require someone to place all or a part of his or her body between the die or mold halves. This is dangerous for the reasons discussed above.

Accordingly, the present invention is directed to overcoming one or more of the problems as set forth above.

DISCLOSURE OF THE INVENTION

According to one aspect of the present invention, apparatus for changeably forming information such as date, time, shift, and/or lot of manufacture, on members being die cast or molded, is disclosed. The present apparatus includes an information forming element adapted to be mounted in communication with an interior cavity of a die or mold for the member. The information forming element has a face including a mirror image of the information positioned for forming the information on the member. The face is adjustably movable relative to a reference element in the interior cavity for changing the information. An adjusting element is adapted to be positioned at an external location relative to the die or mold, the adjusting element when operatively connected to the information forming element being operable for adjustably moving the face of the information forming element relative to the reference element for changing the information formed on the member. The present apparatus further includes a connecting element adapted for extending through a cavity block or other member of the die or mold for operatively connecting the adjusting element to the information forming element, to allow moving the face of the information forming element relative to the reference element.

According to a preferred aspect of the invention, the present apparatus includes at least one additional information forming element adapted to be mounted in communication with the interior cavity of the die or mold and having an additional face positioned for forming additional information on the member. The additional face is adjustably movable relative to a reference element for changing the additional information. An additional adjusting element or elements, and an additional connecting element or elements are provided for effecting movement of the additional face or faces, respectively.

The information forming elements of the present invention are preferably concentric about an axis and are independently rotatable by rotating the adjusting elements for changing the information to be formed on the member from outside of the die.

BEST MODE FOR CARRYING OUT THE INVENTION

Figure 1:
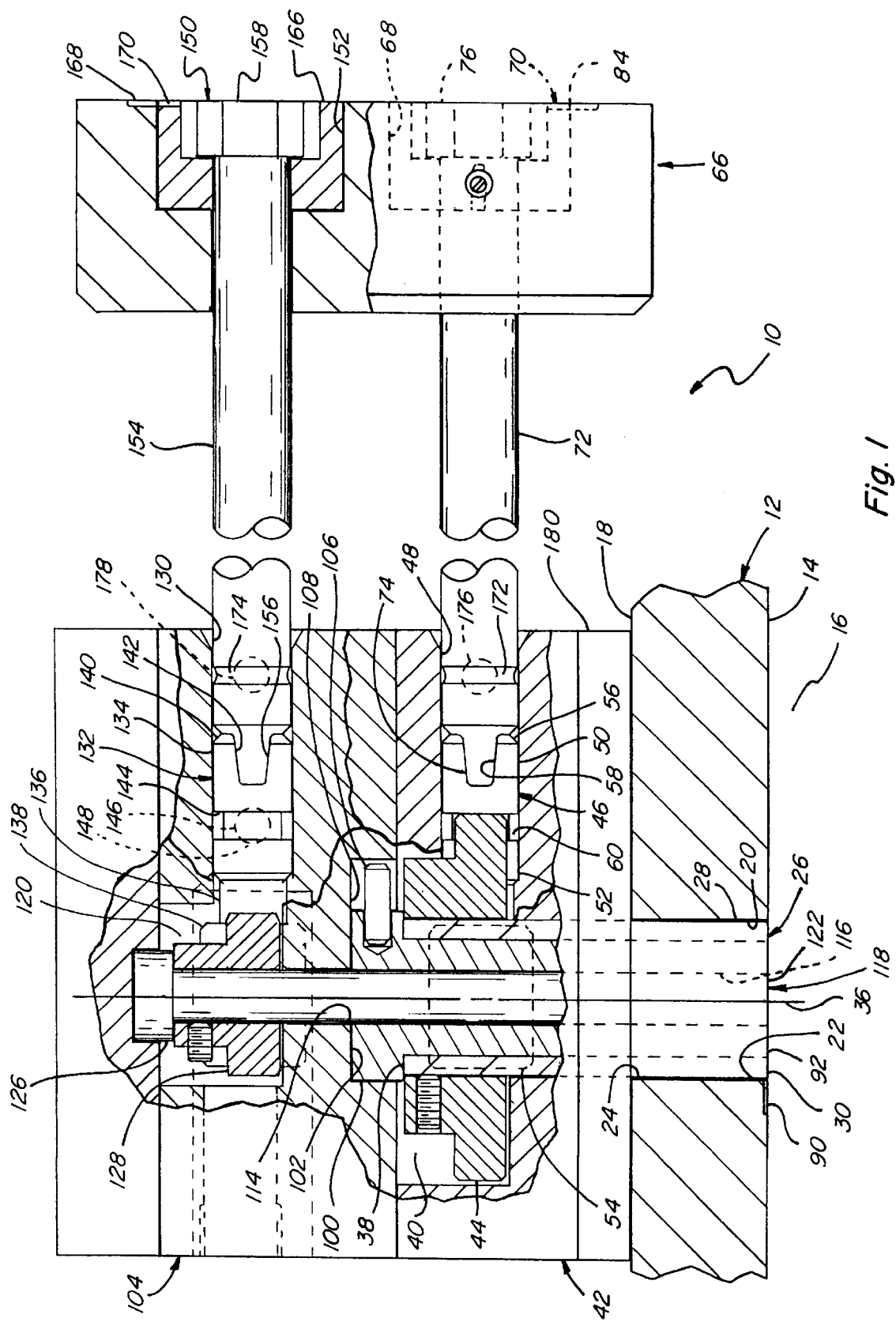
FIG. 1 is a top view in partial cross-section of apparatus of the present invention shown in operative position mounted to a cavity block of a die casting die.
Figure 2:
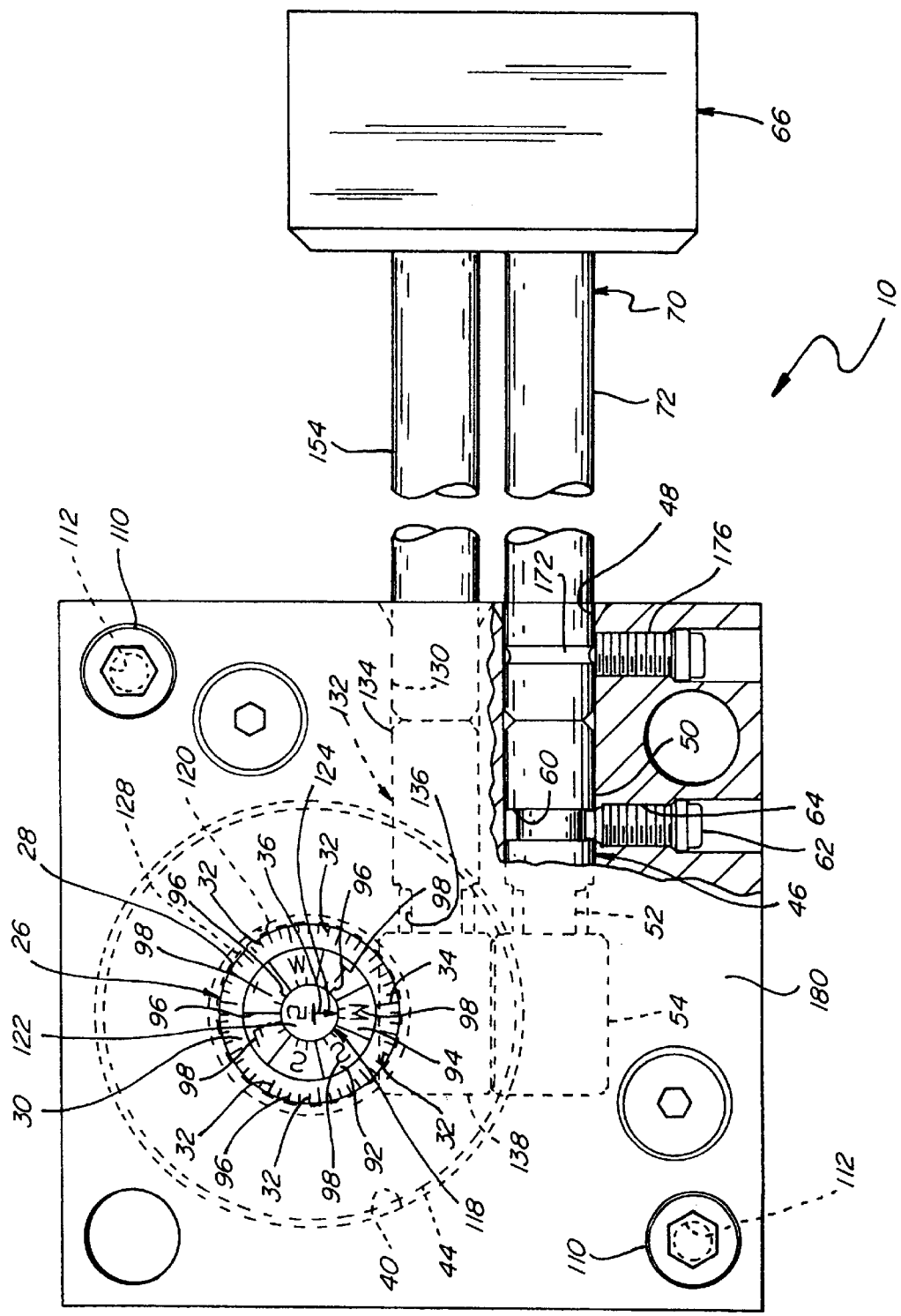
FIG. 2 is a front view in partial cross-section of the apparatus of FIG. 1.

Referring now more particularly to the drawings wherein like reference numbers refer to like parts, FIGS. 1 and 2 show apparatus 10 for changeably forming information on members (not shown) when die cast or molded, according to the present invention. Apparatus 10 is shown in FIG. 1 in association with a conventional cavity block 12 of a die casting die, however, it should be understood that the present apparatus 10 is also usable in association with a mold. Cavity block 12 is representative of typical ejector cavity blocks and cover cavity blocks used for die casting a wide variety of parts and members, cavity block 12 including an interior surface 14 which defines an interior cavity 16 which will be filled with molten metal (not shown) in the conventional manner for forming the member or part. Cavity block 12 further includes an external surface 18 opposite interior surface 14, and a passage 20 extending between an interior opening 22 in communication with interior cavity 16 and an external opening 24 on external surface 18.

The present apparatus 10 includes a first information forming element 26 located in passage 20. First information forming element 26 is an elongated tubular member having a first end 28 positioned in interior opening 22. First end 28 includes an annular face 30 positioned in communication with interior cavity, face 30 including a mirror image of a portion of the information to be formed on the member or part. Here, the information preferably includes fifty-one radially extending grooves 32 and a longer radially extending groove 34 formed into face 30 at uniformly angularly spaced circumferential locations 6.923° apart around an axis 36. Grooves 32 and 34 denote the 52 weeks of a year, longer groove 34 denoting an initial reference week, for instance, the first week of the calendar month January. First information forming element 26 is rotatable about axis 36 and includes a second end 38 located opposite first end 28. Second end 38 is located within a cavity 40 of a first gear box 42 and includes a fifty-two tooth gear 44 mounted for rotation therewith. A first connecting element 46 is mounted for rotation in a bore 48 of first gear box 42 and includes a first stub shaft 50 having a first end 52 extending from bore 48 into cavity 40 of gear box 42. A worm gear 54 is mounted to first end 52 for rotation therewith, worm gear 54 being enmeshed with gear 44. Importantly, worm gear 54 and gear 44 have a 52:1 gear ratio, such that one complete revolution of worm gear 54 will rotate gear 44 and first information forming element 26 including face 30 by an amount equal to 6.923°, which corresponds to a date period of one week. Stub shaft 50 has a second end 56 opposite first end 52 including a bayonet receptacle 58 facing axially outwardly in bore 48. Additionally, stub shaft 50 includes a circumferential groove 60 intermediate first end 52 and second end 56, which groove 60 is engaged by a set screw 62 threadedly engaged in threaded bore 64 in gear box 42, for retaining stub shaft 50 in bore 48.

Figure 3:
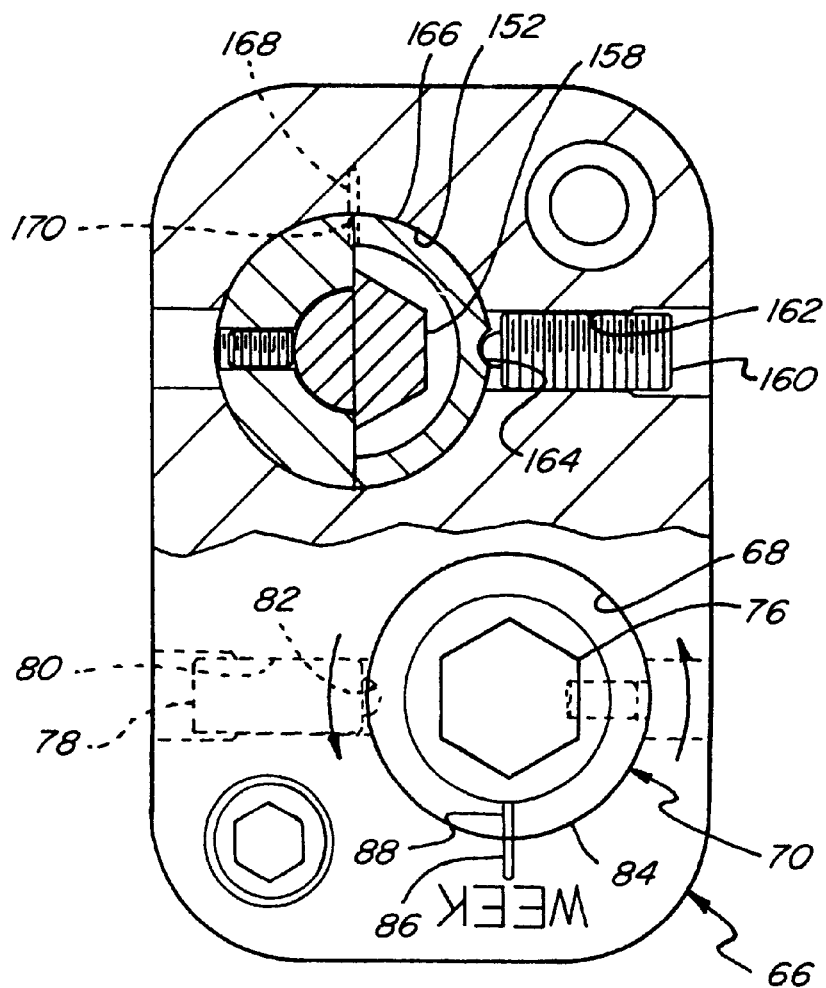
FIG. 3 is a side view showing an adjusting element of the apparatus of FIG. 1.

Referring also to FIG. 3, apparatus 10 further includes an adjusting block 66 located externally to cavity block 12 and including a first stepped bore 68. An adjusting element 70 is mounted for rotation in stepped bore 68 and includes an elongated adjusting shaft 72 having a bayonet end 74 sized and shaped for cooperative engagement with bayonet receptacle 58 of stub shaft 50 and an opposite hexagonal adjusting screw 76. Adjusting block 66 includes a spring loaded ball detent element 78 threadedly mounted in a threaded side bore 80 communicating with stepped bore 68, detent element 78 being in position for engaging a detent receiver 82 in a circumferential surface of a sleeve 84 located around adjusting screw 76. Adjusting block 66 includes a reference line 86 at a fixed circumferential location adjacent sleeve 84, and sleeve 84 includes a reference line 88 alignable with reference line 86. A reference element 90 is located on interior surface 14 of cavity block 12 adjacent face 30 of information forming element 46. Grooves 32 and 34, reference element 90, bayonet receptacle 46 and bayonet end 74 are in timed relation with detent receiver 82 and reference line 88, such that when reference line 88 is aligned with reference line 86, a groove 32 or 34 will be aligned with reference element 90. Then, when adjusting element 90 is rotated from this aligned position one or more full revolutions to again align reference line 88 with reference line 86, face 30 of information forming element 26 will be rotated by 6.923° for each revolution so as to align another groove 32 or 34 with reference element 90. Detent element 78 is positioned to engage detent receiver 82 when reference lines 86 and 88 are aligned, to provide positive feed back of the aligned condition.

Apparatus 10 further includes a tubular reference element member 92 disposed in a passage through tubular information forming element 26 in concentric relation therewith about axis 36. Tubular reference element member 92 includes an annular face 94 generally coplanar with face 30 of information forming element 26 in interior opening 22, face 94 including 21 radially extending grooves 96 therein which serve as reference elements located at uniformly angularly spaced locations 17.143° apart around the inner periphery thereof. Every third groove 96 is longer than the adjacent grooves, and letters 98 are formed in face 94 intermediate the longer grooves 96 representing the respective seven days of a calendar week. Tubular reference element member 92 includes an opposite base end 100 mounted in a counterbore 102 of a second gear box 104. A dowel pin 106 is mounted in a circumferential surface of base end 100 and is cooperatively received in a radial extension 108 of counterbore 102 for preventing rotation of tubular reference element member 92. Second gear box 104 is mounted to first gear box 42 with a pair of socket head bolts 110 which pass through first gear box 42 and threadedly engage threaded bores 112 in second gear box 104. Second gear box 104 includes a connecting bore 114 in communication with cavity 40 of first gear box 42 and in alignment with a bore 116 extending through tubular reference element member 92.

A cylindrical shape second information forming element 118 extends through bore 116 and connecting bore 114 to a cavity 120 of second gear box 104. Second information forming element 118 includes a face 122 communicating with interior cavity 16 of cavity block 12 in generally coplanar relation with face 30 of first information forming element 26 and face 94 of tubular reference element member 92. Face 122 includes an arrow pointer 124 engraved or otherwise formed therein and facing radially outwardly toward letters 98 on face 94 of member 92. Second information forming element 118 also includes an end portion 126 opposite face 122 including a twenty-one tooth gear 128 mounted thereto for rotation therewith A connecting bore 130 extends through second gear box 104 to cavity 120 and contains a second connecting element 132 including a second stub shaft 134 mounted for rotation in bore 130. Second stub shaft 134 has a first end 136 extending into cavity 120 and including a second worm gear 138 mounted thereto for rotation therewith and enmeshed with gear 128. Second stub shaft 134 includes a second end 140 including a second bayonet receptacle 142, and an intermediate located circumferential groove 144 receiving a set screw 146 threadedly engaged in a threaded bore 148 in second gear box 104 for retaining second stub shaft 134 in connecting bore 130.

A second adjusting element 150 is mounted for rotation in a second stepped bore 152 through adjusting block 66. Second adjusting element 150 includes an elongated adjusting shaft 154 having a bayonet end 156 sized and shaped for cooperative engagement with bayonet receptacle 142 of second stub shaft 154, and an opposite hexagonal adjusting screw 158. A second spring loaded ball detent element 160 (FIG. 3) is threadedly mounted in a threaded side bore 162 communicating with stepped bore 152, detent element 160 being positioned for engaging a detent receiver 164 in a circumferential surface of a sleeve 166 located around adjusting screw 158. Adjusting block 66 includes a second reference line 168 at a fixed circumferential location adjacent sleeve 166, and sleeve 166 includes a reference line 170 alignable with reference line 168. Arrow pointer 124, bayonet receptacle 142 and bayonet end 156 are in timed relation with detent receiver 164 and reference line 170, such that when reference line 170 is aligned with reference line 168, arrow pointer 124 will be positioned at a location intermediate two adjacent grooves 96 on tubular member 92. In this way, grooves 96 and letters 98 serve as reference elements for arrow pointer 124, rotation of adjusting screw 158 between a position wherein reference line 168 and reference line 170 are aligned, and a second position wherein they are again aligned, serving to rotate pointer 124 past one groove 96, to thereby denote a shift change.

Adjusting shafts 72 and 154 include grooves 172 and 174 therein, respectively, adjacent bayonet ends 74 and 156, which grooves 172 and 174 are adapted for cooperative engagement with ball detents 176 and 178 mounted in first gear box 42 and second gear box 104, respectively, for retaining shafts 72 and 154 in operative engagement with connecting elements 46 and 132. Adjusting shafts 72 and 154 will typically extend through bores of a mold base (not shown) such that adjusting block 66 is positioned at a desired external location with respect to a mold or die with which apparatus 10 is used, to enable quickly and easily changing the shift and week information, as required. Additionally, cavity blocks such as cavity block 12 are subject to high temperatures resultant from the molten metal used for forming the members or parts therein. In order to reduce the amount of heat transferred to apparatus 10 from the cavity block, a heat insulator 180 is disposed between first gear box 42 of apparatus 10 and external surface 18 of cavity block 12.

In operation, when molten metal is introduced into interior cavity 16, the molten material will fill grooves 32 and 34 of first information forming element 26, reference element 90, grooves 96, letters 98, and arrow pointer 124 such that when the molten metal solidifies, desired week and shift information will be formed on the die cast member. At the beginning of a new shift, adjusting screw 158 can be rotated a full revolution to rotate second information forming element 118 and arrow pointer 124 thereof for denoting the new shift. At the beginning of a new week, adjusting screw 176 can be rotated one full revolution to rotate information forming element 26 for aligning a groove 32 or 34 with reference element 90 to denote the new week. This information will then be formed in subsequently die cast parts until first information forming element 26 and/or second information forming element 118 are again moved.

Figure 4:
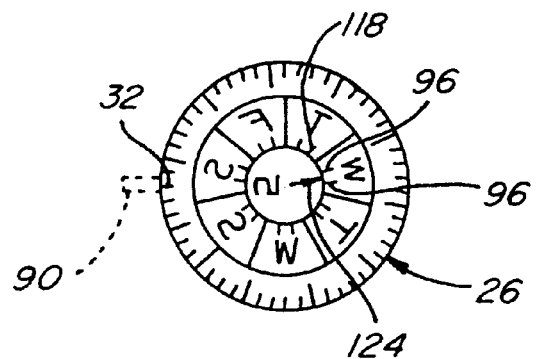
FIG. 4 is a front view of information forming elements of the apparatus of FIG. 1 shown in changed positions.

Turning to FIG. 4, first information forming element 26 and second information forming element 118 are shown moved in the above described manner such that a different groove 32 is aligned with reference element 90 and arrow pointer 124 is aligned with a different segment denoted by grooves 96, denoting a different week and shift. Here, it should be recognized and understood that the information denoted by information forming elements 26 and 118 can be different from the week and shift information shown. Additional information can also be included. For instance, information denoting manufacturing lots and/or die casting machines, operators, plants, and the like, could be alternatively or additionally denoted. For instance, here an additional number is formed in face 122 of second information forming element 118 which can be a year designation, die casting machine or line designation, or the like. Furthermore, apparatus 10 can optionally include any number of additional information forming elements to form desired additional information on the die cast parts. Still further, it should be understood that while the information forming elements 26 and 118 are shown adapted for use with cavity block 12 shown, those elements could likewise be adapted for use with a wide variety of different cavity block configurations of various thicknesses, positions and orientations, it only being required that the information forming elements be positioned so as to impart the desired information on the parts or members being die cast. In a similar regard, it is contemplated that adjusting shafts of adjusting element 70 can be of any desired length for use with a wide variety of different die casting molds, bases and the like.

INDUSTRIAL APPLICABILITY

The present apparatus for changeably forming information on die cast or molded members has utility for use in a wide variety of die casting and molding applications, including plastics molding, and other applications where a danger is posed to persons who must enter or insert a part of their body into a cavity which is hot and, or could close on them and cause injury. Additionally, it is contemplated that the present apparatus would save time when it is needed to change the information formed thereby.

Other aspects, objects and advantages of the present invention can be obtained from a study of the drawings, the disclosure and the appended claims.

What is claimed is:

1. Apparatus for forming information on a member being die cast or molded, comprising:

a first information forming element to be mounted in connection with an interior cavity of a die or mold for the member in predetermined movable relation to a reference element in the interior cavity positioned to be formed on the member when die cast or molded, the first information forming element having a face including a mirror image of information positioned for forming the information on the member when die cast or molded, the face being adjustably moveable relative to the reference element in the interior cavity for changing the first information;

an adjusting element to be positioned at an external location relative to the die or mold, the adjusting element when operatively connected to the information forming element being movable for adjustably moving the face of the first information forming element relative to the reference element for changing the information to be formed on the member;

a first connecting element for extending through the die or mold for operatively connecting the adjusting element to the information forming element;

a detent element located in predetermined timed relation to the reference element in position for engaging the adjusting element only when the face of the first information forming element is in any one of a plurality of predetermined aligned positions in relation to the reference element to provide positive feedback of the face being moved by the adjusting element to said any one of the plurality of aligned positions; and a reference indicator positioned at an external location relative to the die or mold in predetermined timed relation to the reference element, and a reference indicator on the adjusting element positioned such that the indicators will be in predetermined alignment when the face of the information forming element is in any one of said plurality of aligned positions in relation to the reference element.

2. The apparatus of claim 1, wherein the face of the information forming element includes information indicative of a date period.

3. The apparatus of claim 1, wherein the face of the information forming element includes information indicative of a time period.

4. The apparatus of claim 1, wherein the information forming element is rotatable relative to the die or mold for adjustably moving the face relative to the reference element, the adjusting element being rotatable and operatively connected in timed relation to the information forming element by enmeshed gears having a ratio such that about one revolution of the adjusting element will rotate the face of the first information forming element by a fraction of one revolution thereof equal to a predetermined distance between any two successive ones of the plurality of aligned positions in relation to the reference element.

5. The apparatus of claim 1, wherein the information forming element and the first connecting element comprise gears which are enmeshed connecting the adjusting element in timed relation to the information forming element.

6. The apparatus of claim 1, further comprising a second information forming element to be mounted in connection with the interior cavity of the die or mold, the second information forming element having a second face positioned for forming additional information on the member, the second face being adjustably movable relative to a second reference clement for changing the additional information;

a second adjusting element to be positioned at an external location relative to the die or mold and being movable when connected to the second information forming element for adjustably moving the face of the second information forming element relative to the second reference element for changing the additional information to be formed on the member;

a second connecting element for extending through the die or mold for connecting the second adjusting element to the second information forming element; and a second detent element located in predetermined timed relation to the second reference element in position for engaging the second adjusting element only when the face of the second information forming element is in any one of a plurality of aligned positions in relation to the second reference element to provide positive feedback of the face of the second information forming element being moved by the second adjusting element to said any one of the plurality of aligned positions.

7. The apparatus of claim 6 wherein the first information forming element and the second information forming element are concentric about an axis and are independently rotatable about the axis for changing the first information and the additional information, respectively.

8. The apparatus of claim 7, wherein the second reference clement comprises an annular member fixedly disposed between the first information forming element and the second information forming element, and the first reference element is disposed radially outwardly of the first information forming element.

9. The apparatus of claim 6, wherein the first connecting element and the second connecting element comprise concentric rods positionable in a bore extending through the die or mold.

10. The apparatus of claim 6, wherein the first information forming element includes information indicative of a shift and the second information forming element includes information indicative of a week.

11. The apparatus of claim 6, further comprising a reference line on the second adjusting element and a reference line at an external location relative to the die or mold, the reference lines being in a predetermined alignment when the face of the second information forming element is in any of the aligned positions in relation to the second reference element.

12. The apparatus of claim 6, wherein the second information forming element and the second connecting element comprise gears which are enmeshed to operatively connect the second adjusting element in timed relation to the second information forming element.

13. A die or mold element for die casting or molding a member, comprising:

an interior surface defining an interior cavity in which the member is to be die cast or molded, an external surface opposite the interior surface, and a passage extending between the interior surface and the external surface;

a first information forming element mounted for rotation in the passage in connection with the interior cavity, the first information forming element having a face including a mirror image of the information positioned for forming the information on the member when die cast or molded, the face being rotatably positionable in any of a plurality of predetermined aligned positions relative to a reference element located in the interior cavity and adjustably rotatable relative to the reference element for changing the information;

a first adjusting element mounted for rotation externally to the die or mold element and rotatable when connected to the first information forming element for adjustably rotating the face of the first information forming element relative to the first reference element for changing the information formed on the member;

a first connecting element extending through the passage connecting the first adjusting element in timed relation to the first information forming element such that when the first adjusting element is rotated by a predetermined amount, the face of the first information forming element is rotated by a corresponding amount relative to the reference element; and a reference indicator located externally of the die or mold element in predetermined timed relation to the reference element located in the interior cavity, and a reference indicator located on the first adjusting element in predetermined relation to the information on the face of the first information forming element such that the first adjusting element can be rotatably moved from outside of the die or mold element to align the reference indicators to position the face of the first information forming element in one of the aligned positions relative to the reference element.

14. The die or mold element of claim 13, wherein the face of the information forming element includes information indicative of a date period.

15. The die or mold element of claim 13, wherein the face of the information forming element includes information indicative of a time period.

16. The die or mold element of claim 13 further comprising a second information forming element mounted for rotation in connection with the interior cavity, the second information forming element having a second face positioned for forming additional information on the member when die cast or molded, the second face being rotatable positionable in any of a plurality of predetermined aligned positions relative to a second reference element located in the interior cavity and adjustably rotatable relative to the second reference element for changing the additional information;

the second adjusting element positioned at an external location relative to the die or mold element and being rotatably movable when connected to the information forming element for adjustably rotating the face of the second information forming element;

a second connecting element extending through the passage connecting the second adjusting element in timed relation to the second information forming element such that when the second adjusting element is rotated by a predetermined amount, the face of the second information forming element is rotated by a corresponding amount relative to the second reference element; and a reference line located externally of the die or mold element in predetermined timed relation to the second reference element located in the interior cavity, and a reference line located on the second adjusting element in predetermined relation to the information on the face of the second information forming element such that the second adjusting element can be rotatably moved from outside of the die or mold element to align the reference lines to position the face of the second information forming element in one of the aligned positions relative to the second reference element.

17. The die or mold element of claim 16, wherein the first connecting element and the second connecting element are concentric and independently rotatable for adjustably rotating the faces of the information forming elements, respectively.

18. The die or mold element of claim 17, wherein the first connecting element is connected to the first information forming element by a first set of enmeshed gears for connecting the first adjusting element is timed relation thereto, and the second connecting element is connected to the second adjusting element by a second set of enmeshed gears for connecting the second adjusting element in the timed relation thereto.

19. Apparatus for forming information on a member being die cast or molded, comprising:

a first information forming element to be mounted in connection with an interior cavity of a die or mold for the member in predetermined movable relation to a reference element in the interior cavity positioned to be formed on the member when die cast or molded, the first information forming element having a face including a mirror image of information positioned for forming the information on the member when die cast or molded, the face being adjustably moveable relative to the reference element in the interior cavity for changing the first information;

an adjusting element to be positioned at an external location relative to the die or mold, the adjusting element when operatively connected to the information forming element being movable for adjustably moving the face of the first information forming element relative to the reference element for changing the information to be formed on the member;

a first connecting element for extending through the die or mold for operatively connecting the adjusting element to the information forming element; and a detent element located in predetermined timed relation to the reference element in position for engaging the adjusting element only when the face of the first information forming element is in any one of a plurality of predetermined aligned positions in relation to the reference element to provide positive feedback of the face being moved by the adjusting element to said any one of the plurality of aligned positions, wherein the information forming element is rotatable relative to the die or mold for adjustably moving the face relative to the reference element, the adjusting element being rotatable and operatively connected in timed relation to the information forming element by enmeshed gears having a ratio such that about one revolution of the adjusting element will rotate the face of the first information forming element by a fraction of one revolution thereof equal to a predetermined distance between any two successive ones of the plurality of aligned positions in relation to the reference element.

* * * * *

UNITED STATES PATENT AND TRADEMARK OFFICE
CERTIFICATE OF CORRECTION

PATENT NO. : 6,299,126 B1 Page 1 of 1
DATED : October 9, 2001
INVENTOR(S) : Robert H. Hughes, II It is certified that error appears in the above-identified patent and that said Letters Patent is hereby corrected as shown below:

<u>Column 8,</u>
Line 37, "clement" should be -- element --.

Signed and Sealed this

Twenty-eighth Day of May, 2002

Attest:

Attesting Officer

JAMES E. ROGAN
*Director of the United States Patent and Trademark Office*